Figure 1:
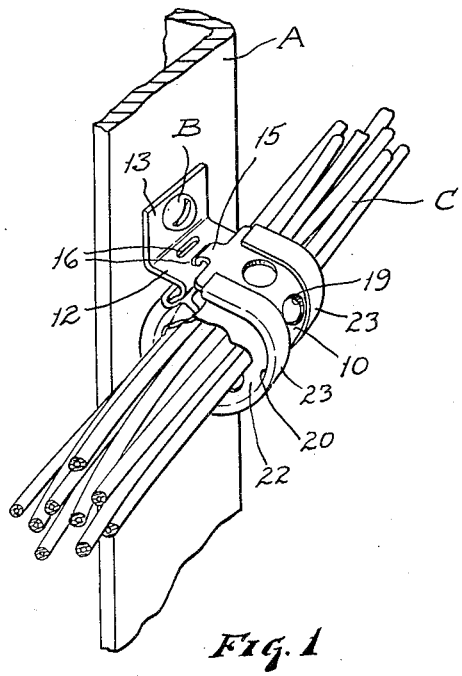

Feb. 1, 1944.  G. A. TINNERMAN  2,340,713

SNAP CLAMP

Filed Feb. 15, 1943

INVENTOR.
George A. Tinnerman
BY Bates, Teare & McBean,
Attorneys.

Patented Feb. 1, 1944

2,340,713

UNITED STATES PATENT OFFICE 2,340,713

SNAP CLAMP

George A. Tinnerman, Cleveland, Ohio, assignor to Tinnerman Products, Inc., Cleveland, Ohio, a corporation of Ohio Application February 15, 1943, Serial No. 475,870

2 Claims. (Cl. 248—74)

This invention relates to a clamp of the type which is adapted to be attached to a support and be readily closed about an object or opened to release the object whenever desired. My clamp is preferably a normally open U-shaped spring member, the intermediate body portion of which may embrace the article to be retained while one of the end portions provides for the attachment of the body to the support, there being provision for engagement of the other end portion with the body adjacent the region of attachment to close the clamp by snap action.

The invention is in the nature of an improvement on the snap clamp disclosed in my pending application No. 464,338, filed November 3, 1942, and relates particularly to means whereby the clamp may be closed in a plurality of positions and thus be adapted to embrace objects of different size, with desired snugness.

My invention is well adapted for holding a bundle of wires, such as are used, for instance, in airplane work, and is operable to snugly embrace groups of various numbers or sizes of wires. The clamp may be attached to the group of wires and thereafter mounted on the support, or the clamp may be mounted before the wires are placed and by being open provide a convenient receptacle in which the wires may be laid, after which the clamp may be snapped shut.

Since the clamp may be snapped open or shut, as desired, it provides for a quick replacement of a damaged wire or the insertion of an additional wire or wires, which actions are especially valuable in airplane installations, where the matter of time involved is of great importance.

Two approved embodiments of my invention are illustrated in the drawing hereof and are hereinafter more fully described.

Figure 2:
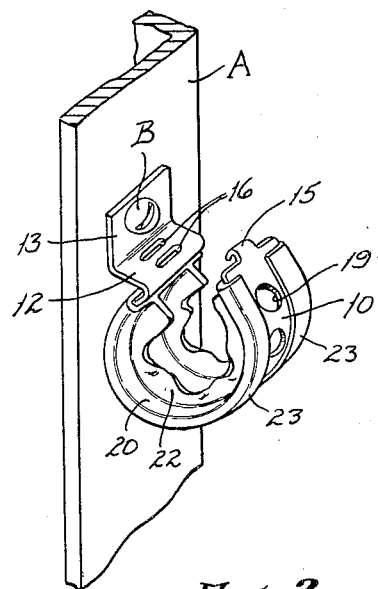
Figure 3:
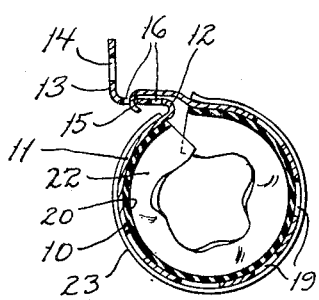
Figure 4:
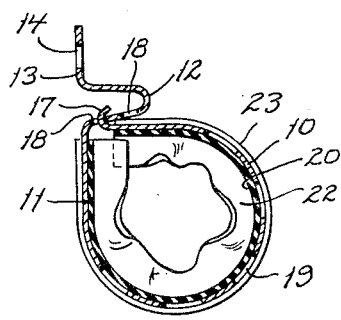

In the drawing, Fig. 1 is a perspective showing one of my clamps mounted on a support and embracing a bundle of wires; Fig. 2 is a view of the same clamp attached to the support but open to receive the object or objects to be clamped; Fig. 3 is a vertical section of the clamp of Figs. 1 and 2, in closed position; Fig. 4 is a similar view of a modified form of my clamp.

As shown, the body of my clamp comprises a strap 10 of spring sheet metal, preferably straight in its lateral cross section, and looped into U-shape. The body portion preferably carries a yielding lining 20 which assists in tightly holding the object clamped. The two end portions of the loop beyond the lining are specially formed to interlock with each other, and to provide for the attachment of the clamp to a support, as about to be explained.

One end of the body terminates in an arm designated 11, which is bowed forwardly and then rearwardly to provide a rearwardly open trough-like or U-shaped portion 12, the arm then continuing as a flat portion 13 approximately aligned with the portion of the body on the other side of the trough. An opening 14 through the flat extension provides for the passage of a screw to attach the clamp fixedly to a support. This is indicated in Figs. 1 and 2 where A indicates the support and B the attaching screw.

The free end of the loop 10 is formed in the central region with a projecting hook made by bending the narrow end portion of the body and the corrugation 12 of the body is provided with a plurality of openings into any of which the hook may extend to close the clamp with different degrees of contraction. As two forms of this adjustable hooking features are shown in the drawings they will now be described individually.

Referring first to Figs. 1, 2 and 3, the hook designated 15 faces downwardly and the plurality of openings designated 16 in the corrugation 12 of the body are formed in the upper reach of that corrugation. When the clamp is being closed about the object, the closing action swings the hook 15 downwardly so that it passes into one of the openings 16, or in the first instance, strikes the body of the corrugation in front of such openings or between the openings and then the further contraction causes the hook to slide along the top surface of the corrugation until it registers with the opening desired, into which it is pressed. The natural spring action of the metal body tends to open the clamp as indicated in Fig. 2, but the backward return of the end portion of the hook extending beneath the upper region of the corrugation retains the clamp in closed position, whenever the hook has been inserted in the opening. Each of the openings 16 is enough larger than the hook so that the hook may be very readily pressed down into the selected opening.

In the form shown in Fig. 4, the hook 17 extends upwardly from the end of the body and the receiving openings 18 are formed in the under reach of the corrugation 12. When this form of clamp is being closed, the point of the hook engages the under face of the corrugation and slides along it until the hook registers with one of the openings which it then enters immediately upon release of the constricting manual pressure on the body.

To enable the body to have sufficient rigidity in its attaching and corrugated portions and still be sufficiently yielding in its looping portion, I prefer to have a series of holes 19 along the central region of the looping portion whereby it may be more readily flexed.

As heretofore stated, the clamp is preferably provided with the yielding lining to enable it to grasp more effectively objects of varying sizes. As shown, this lining, which is made of soft rubber or similar material, comprises a band 20 lying on the inner surface of the loop and suitably held thereon and having a plurality of inwardly projecting puckered webs 22, which are adapted to bear against the exterior of the object carried, throughout a considerable range in size of such object. As shown in the drawing, the band is held in place by forming the marginal portions thereof so that they bend backwardly as shown at 23, and thus lie on the exterior of the metal loop and hold the rubber member in place. The particular lining shown, however, is not claimed herein but in another application of mine.

It will be seen that my clamp is adapted to be placed instantly about a bundle of wires, as illustrated in Fig. 1, where C indicates the bundle, and when so placed may hold itself closed by means of the adjustable snapping engagement, though the wires may vary in number and size in different bundles. This is of material advantage in airplane work where it enables the tight clamping of a bundle of wires, though the size of the bundles vary. Clamps may be put in place and closed in advance of the mounting, but ready for immediate mounting merely by the insertion of the supporting screws. In the original assemblage of the wires and in use whenever it is necessary to replace a wire or to insert extra wires, this may be done in the minimum of time. The yielding lining cooperates with the adjustable closing of the clamp to maintain the compact engagement desired. It will be understood, of course, that in practice the clamps will vary in size according to the general nature of the bundles of wires or other articles to be clamped. The showing of two openings for the variable clamping action is intended as an indication of any suitable number should more than two be desired.

Whenever the maximum size of bundle is clamped and especially in the case of a very small bundle with a small clamp, the embodiment of Figs. 1, 2 and 3 is preferable as no extra compression of the bundle is required in placing the hook in the desired opening, but both forms illustrated have been found very effective in service.

I claim:

1. A clamp comprising a loop of spring material, one end portion of the loop having an opening for the passage of a screw adapted to attach it to a support and the two end portions having means beyond the range of the screw to interlock by snap action in a plurality of regions to hold the clamp variably closed.

2. A clamp comprising a loop of spring material, one end portion of the loop having a forwardly extending U-shaped part with a plurality of openings one behind the other in one reach of said U-shaped part and a hook at the other end of the loop adapted to enter any of said openings.

GEORGE A. TINNERMAN.